(12) United States Patent
Ayouba et al.

(10) Patent No.: US 11,983,235 B2
(45) Date of Patent: May 14, 2024

(54) DYNAMIC RESOURCE USAGE WEB BROWSER

(71) Applicant: International Business Machines Corporation, Armonk, NY (US)

(72) Inventors: Gael Ayouba, Montpellier (FR); Ivan Deleuze, Montpellier (FR); Victor Tardieu, Montpellier (FR); Anthony Morales, Baillargues (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/448,356

(22) Filed: Sep. 22, 2021

(65) Prior Publication Data

US 2023/0092328 A1 Mar. 23, 2023

(51) Int. Cl.
*G06F 16/957* (2019.01)
*G06F 9/50* (2006.01)
*G06F 16/958* (2019.01)

(52) U.S. Cl.
CPC ........ *G06F 16/9577* (2019.01); *G06F 9/5016* (2013.01); *G06F 9/5027* (2013.01); *G06F 16/958* (2019.01)

(58) Field of Classification Search
CPC ..... G06F 9/5013; G06F 9/5027; G06F 9/5016
See application file for complete search history.

(56) References Cited

U.S. PATENT DOCUMENTS

| 9,069,332 B1* | 6/2015 | Gayles | G06Q 50/205 |
| 2007/0204222 A1 | 8/2007 | Rogan | |
| 2009/0282327 A1 | 11/2009 | Hamilton, II | |
| 2011/0072378 A1* | 3/2011 | Nurminen | G06F 9/5094 |
| | | | 715/771 |
| 2011/0088039 A1* | 4/2011 | Tabone | H04L 67/1097 |
| | | | 718/104 |
| 2012/0260111 A1* | 10/2012 | Tarkoma | G06F 1/3203 |
| | | | 340/657 |
| 2013/0090101 A1* | 4/2013 | Park | G06F 3/147 |
| | | | 455/414.3 |
| 2014/0215341 A1* | 7/2014 | Fratti | G06F 16/4393 |
| | | | 715/730 |

(Continued)

FOREIGN PATENT DOCUMENTS

CN 106886544 A 6/2017

OTHER PUBLICATIONS

Disclosed Anonymously, "A method of customized web browsing to reduce network traffic and energy consumption", An IP.com Prior Art Database Technical Disclosure, IP.com No. IPCOM000233958D, IP.com Electronic Publication Date: Jan. 6, 2014, 5 pages.

(Continued)

*Primary Examiner* — Thu V Huynh
(74) *Attorney, Agent, or Firm* — Stephen R. Yoder

(57) ABSTRACT

A processor retrieves a webpage for rendering in a web browser. A processor identifies at least one zone of the webpage. A processor determines a resource consumption rate for the at least one zone. A processor determines a display area for the at least one zone. A processor determines a consumption ratio based on the resource consumption rate and the display area of the at least one zone. In response to the consumption ratio exceeding a threshold value, a processor disables a rendering of the at least one zone when rendering the webpage in the web browser.

20 Claims, 5 Drawing Sheets

(56) References Cited

U.S. PATENT DOCUMENTS

| | | | |
|---|---|---|---|
| 2014/0365794 A1 | 12/2014 | Decker | |
| 2014/0372594 A1* | 12/2014 | Brinza | H04L 43/08 |
| | | | 709/224 |
| 2016/0019194 A1 | 1/2016 | Mondal | |
| 2016/0364370 A1 | 12/2016 | Zhou | |
| 2017/0149633 A1* | 5/2017 | Arulesan | G06F 11/3062 |
| 2017/0164290 A1 | 6/2017 | Arulesan | |
| 2017/0228849 A1* | 8/2017 | Huang | H04N 21/41407 |
| 2018/0217964 A1 | 8/2018 | Lin | |
| 2019/0139080 A1* | 5/2019 | Roy | G06F 16/957 |

OTHER PUBLICATIONS

Zhu et al., "High-Performance and Energy-Efficient Mobile Web Browsing on Big/Little Systems", 2013, IEEE, 12 pages.
"Patent Cooperation Treat PCT Notification of Transmittal of the International Search Report and the Written Opinion of the International Searching Authority, or the Declaration", Applicant's file reference P202100539PCT01, International application No. PCT/EP2022/075989, International filing date Sep. 19, 2022, Date of mailing Jan. 20, 2023, 13 pages.

\* cited by examiner

DYNAMIC RESOURCE USAGE WEB BROWSER

BACKGROUND OF THE INVENTION

The present invention relates generally to the field of web browsers, and more particularly to dynamically rendering a web page based on resource usage.

Web browsers are programs that retrieve web-based content, such as hypertext markup language (HTML) documents. Web browsers translate the content of the HTML documents into machine instructions to generate the webpage on a display device for user interaction. Modern webpages typically require custom scripts and other elements to create more media-enriched user experiences which, in turn, increase resource usage of rendering and delivering a web page to a user.

SUMMARY

Embodiments of the present invention provide a method, system, and program product to dynamically render a web page based on resource usage. A processor retrieves a webpage for rendering in a web browser. A processor identifies at least one zone of the webpage. A processor determines a resource consumption rate for the at least one zone. A processor determines a display area for the at least one zone. A processor determines a consumption ratio based on the resource consumption rate and the display area of the at least one zone. In response to the consumption ratio exceeding a threshold value, a processor disables a rendering of the at least one zone when rendering the webpage in the web browser.

DETAILED DESCRIPTION

Figure 1:
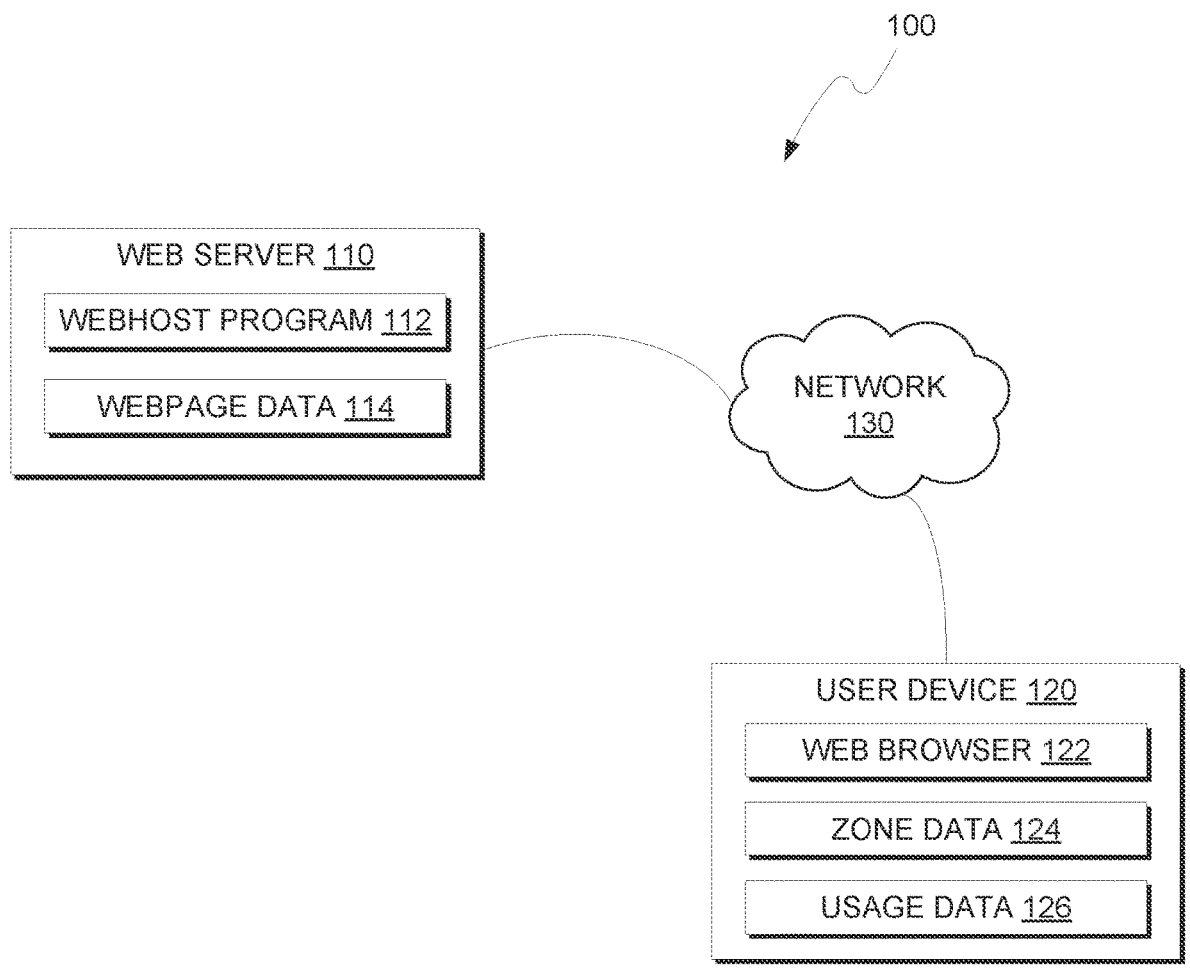
FIG. 1 is a functional block diagram illustrating a networked environment, in accordance with an exemplary embodiment of the present invention.

While solutions to adjust a web page's resource consumption exist, such prior solutions require the webpage itself to adjust to a web browser's needs, such as proving a mobile formatted webpage to a device with a slow network connection. Embodiments of the present invention recognize that by determining the resource usage of various zones of a webpage, a web browser can locally disable zones that incur heavy resource usage. Furthermore, embodiments of the present invention can account for changing resource usage of the local device and alter a webpage according to the current workload or constraints of the device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes web server 110 and user device 120 connected over network 130. Web server 110 includes webhost program 112 and website data 114. User device 120 includes web browser 122, zone data 124 and consumption data 126.

In various embodiments of the present invention, web server 110 and user device 120 are each a computing device that can be a standalone device, a server, a laptop computer, a tablet computer, a netbook computer, a personal computer (PC), or a desktop computer. In another embodiment, web server 110 or user device 120 represent a computing system utilizing clustered computers and components to act as a single pool of seamless resources. In general, web server 110 or user device 120 can be any computing device or a combination of devices with access to website data 114, zone data 124 and consumption data 126 and is capable of executing webhost program 112 and web browser 122. Web server 110 and user device 120 may include internal and external hardware components, as depicted and described in further detail with respect to FIG. 4.

In this exemplary embodiment, webhost program 112 and website data 114 are stored on web server 110; and web browser 122, zone data 124 and consumption data 126 are stored on user device 120. However, in other embodiments, webhost program 112, website data 114, web browser 122, zone data 124 and consumption data 126 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between web server 110 and user device 120, in accordance with a desired embodiment of the present invention.

In various embodiments, webhost program 112 of web server 110 distributes webpage data 114 to one or more users who request a webpage, via network 130, from webhost program 112 for delivery to web browser 122 of user device 120. While, for clarity, the following will be described under a single session between the user and webhost program 112, one of ordinary skill in the art will understand that webhost program 112 is capable of serving a variety of webpages to multiple users. Webpage data 114 includes any hypertext markup language (HTML), along with any images, audio, video, or media required to provide to, or otherwise instruct to retrieve, web browser 122 for the purposes of rendering and constructing the webpage on user device 122. Additionally, webpage data 114 may also include code, scripts, or instructions to execute in order to generate any custom components of the webpage being provided to a user. Custom components include non-HTML supported elements, such as JavaScript, that are used to create custom parts of a webpage, such as video players, custom forms and other interactive elements.

In various embodiments, a user instructs web browser 122 to retrieve a webpage from webhost program 112, such as by typing a uniform resource location (URL) address or clicking a URL hyperlink from another webpage (i.e., as a search result in a search engine) or bookmark. Once the request is routed and a connection is established to web server 110 and user device 120, web browser 122 sends a request to retrieve webpage data 114 associated with the URL from webhost program 112. In response, webhost program 112 sends webpage data 114 to the requesting web browser 122.

Once web browser retrieves the webpage from webpage data 114, web browser 122 parses and interprets the underlying HTML, as well as execute or perform operations related to any custom components, and renders the webpage on user device 120. Webpage rendering is the process of taken the underlying HTML and custom components retrieved from webpage data 114 and translating the HTML, and any custom components, into machine instructions to be performed by user device 120 in order for the website to display properly on user device 120.

In various embodiments, prior to rendering the webpage, web browser 122 evaluates the retrieved webpage data 114 to identify one or more zones of the webpage. Zones as used herein are any component, or group of components of a webpage. Components may include sections or parts of the underlying HTML from the webpage or may also include custom components and the supporting blocks of code or scripts associated with the custom components. Example HTML components may include, but are not limited to, headings, body, paragraph, and other tags (i.e., <h1>, <body>, or <p>, respectively) or any HTML element. Custom components are often supplied as scripts with the HTML <script> tag denoting the custom code or script required to run in order to render this element. Based on the various tags found in webpage data 114, web browser 122 identifies one or more zones of the webpage to be rendered. In some scenarios, web browser 122 may group more than one HTML element to a zone. For example, multiple sequential <p> tags may indicate a series of paragraphs in succession. In such a scenario, web browser 122 groups the sequential <p> tags into a single zone.

In various embodiments, web browser 122 determines a consumption map for the webpage, prior to being rendered for a user (i.e., before the website is displayed to a user. Based on the identified zones and the corresponding HTML or customs components in each zone, web browser 122 determines a resource consumption ratio for each zone. For a given zone, web browser 122 determines a resource usage amount for each zone based on the type of HTML element or custom component contained within the zone. Consumption data 126 includes any determination that web browser 122 has made regarding consumption rate or zones in a webpage. In some scenarios, consumption data 126 is categorized for element or zone type as well as separated into operating characteristics of user device 110 such as CPU usage, RAM usage, Bandwidth usage, Power usage, etc. In such scenarios, web browser 122 includes consumption rates for each factor, indicating if the element has higher CPU or RAM consumption rates.

In some embodiments, web browser 122 has a predefined consumption rate for each type of element and component that can be provided by consumption data 126. For example, a <p>, or paragraph text, element, or group, has a small consumption rate (e.g., 0.1) whereas a custom video player element has a large consumption rate (e.g., 0.8). In some scenarios, based on previous renderings of similar elements on other websites, web browser 122 determines a consumption rate based on historic resource usage metrics of user device 120 when rendering similar content on other websites.

In various embodiments, web browser 122 determines a display area or each zone. The display area is the overall space, or portion of the display monitor, that a zone covers in the rendered webpage. Based on the target display resolution, window size and other factors, web browser 122 determines the display area for each zone, assigning a normalized display area to each zone based on the relative size of each zone (e.g., sizes ranging from 0 to 1.0, with 1.0 being the largest zone's display area). In some embodiments, web browser 122 may need to execute and render one or more custom elements, like code for a video player, if the HTML does not define a size. In such embodiments, web browser may render the element prior to disabling the element in order to determine a display area for the element. In such scenarios, web browser 122 may not display the rendered view to the user until the display area of the zones is determined.

In various embodiments, web browser 122 determines a consumption ratio for each zone. Based on the ratio between the consumption rate (i.e., numerator in the ratio) and display area (i.e., denominator in the ratio) for each zone, web browser 122 determines a consumption ratio. The consumption ratio represents the amount of resources that an element uses when compared to the overall portion of the webpage the element occupies. As such, larger sized areas and less resource intensive zones (e.g., text or static images) can be identified by web browser 122 when compared to other smaller but more resource intensive zones, such as a video ad player that is embedded on the side portion of a news article. While a video player is an overall resource intensive part of webpages, for pages dedicated to a video player (i.e., a livestreaming website or video hosting website) web browser 122 assigns a lower consumption ratio since the resource usage remains constant but the display area is increased, thereby lowering the ratio. As such, embodiments of the invention can selectively disable smaller, yet more resource intensive portions of a webpage that maintain the main portion of the webpage, such as the body, while removing smaller but more intensive zones, thereby lessening the workload of web browser 122 while still delivering the webpage to the user.

In various embodiments, web browser 122 selectively enables or disables zones based on the respective consumption ratio for each zone of a web page. In some scenarios, web browser 122 has a predefined or user-defined threshold ratio that dictates which zones in the webpage that will be enabled and rendered for viewing by the user or disabled and not rendered for viewing by the user. If the consumption ratio exceeds the threshold, then web browser 122 disables the zones from being rendered. If the consumption ratio is below the threshold, then web browser 122 enable the zones and then renders said enabled zones for viewing by the user, as discussed in regard to FIGS. 3A &3B.

In some embodiments, web browser 122 monitors resource usage in an ongoing manner and may selectively enable and disable zones based on changing consumption or display area altercations that occur, such as a user resizing the application window for web browser 122 which may change display areas of the zones. In these embodiments, web browser 122 collects user device 110 operating characteristics that indicates the CPU, RAM and other usage metrics being utilized by user device 110, storing the result in consumption data 126. If web browser 122 detects heavy usage data from user device 110, then web browser can adjust the threshold amounts for disabling zones to account for the increased workload of the device. As discussed herein, web browser 122 identifies zones of a webpage and selectively enables each zone based, in part, on resource consumption of the respective zones. In other scenarios, features discussed herein regarding web browser 122 may also be performed by another program or browser extension. In such scenarios, the other program or extension performs the feature discussed herein and then instruct web browser 122 on which zones to enable or disable when rendering the webpage.

Figure 2:
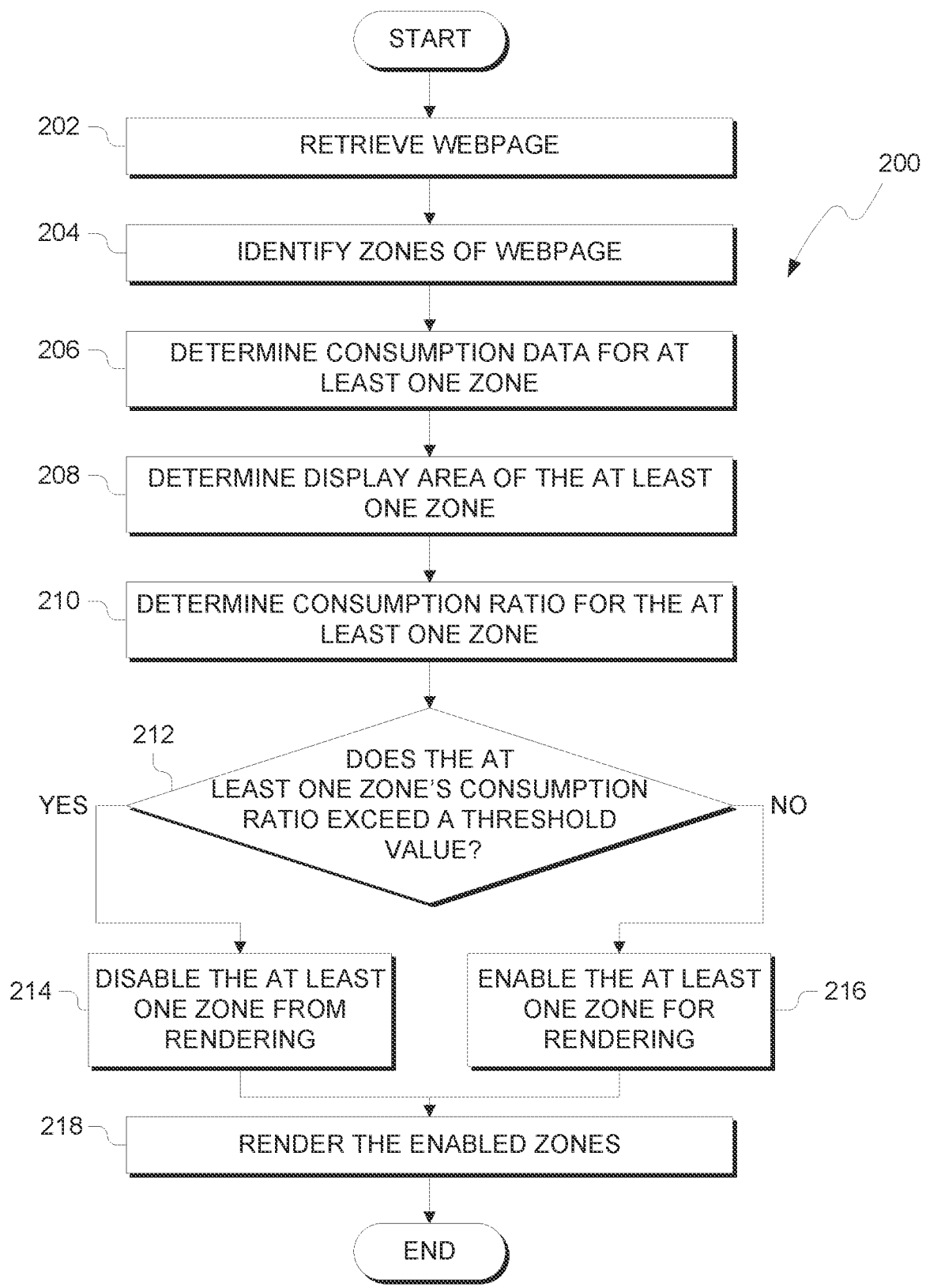
FIG. 2 illustrates operational processes of a web browser, on a computing device within the environment of FIG. 1, in accordance with an exemplary embodiment of the present invention.

FIG. 2 illustrates operational processes of web browser 122, generally designated 200, on user device 120 within the environment of FIG. 1. In process 202, web browser 122 retrieves a webpage. In most scenarios, web browser 122 request a webpage from webhost program 112, which in turn delivers webpage data 114 according to the request. In other scenarios, web browser 122 may be instructed to another location of webpage data 114, such as a local copy of a website stored on user device 120. One of ordinary skill in the art will appreciate that webpage data 114 may by stored and retrieved on any device without deviating from the invention.

In process 204, web browser 122 identifies at least one zone from the retrieve webpage. Based on the underlying HTML, CSS, custom scripts and the like, web browser 122 identifies zones based on the elements of the webpage. In some scenarios, web browser 122 may group similar elements, such as repeated paragraph elements, into a single zone. In process 206, web browser 122 determines consumption data 126 for at least one zone in the webpage. Based on the type of elements or scripts, web browser 122 determines the amount of resource consumption that would be incurred by user device 120 if the zone were to be rendered by web browser 122. For larger amounts of resource usage, web browser 122 assigns a higher consumption rate for the zone. In process 208, web browser 122 determines the display area of the at least one zone. Based on the display dimensions and resolution of user device, web browser 122 determines the display area of each zone if the zone where to be rendered. In some scenarios, web browser 122 normalizes the display value area for each zone, setting the largest to 1.0 with smaller zones set to the scale of the largest zone.

In process 210, web browser 122 determines the consumption ratio for at least one zone of the webpage. The consumption ratio is the relationship between the consumption rate (process 206) and the display area (process 208) of the at least one zone. The consumption ratio indicates zones of the webpage that have relatively high resource consumption rates when compared to the amount of screen real estate that the zone occupies. Larger, less resource intensive zones are typically static elements that require fewer resources (such as a header on a website) when compared to more dynamic and resource intensive, but smaller, zones (such as an interactive chat bot displayed in the bottom corner of the webpage).

In decision process 212, web browser 122 compares the consumption ratio for the at least one zone to a threshold value. The threshold value may be predefined by web browser 122 or may be user-defined or otherwise changed by a user. In some scenarios, web browser 122 may change the threshold value based on current operational metrics of user device 120. If user device 120 is currently under a heavy computational load due to another process, web browser 122 may lower the threshold value to further limit the resource consumption of rendering the webpage.

If the consumption ratio exceeds the threshold value (YES branch of decision process 212), web browser 122 disables the zone from rendering, thereby lessening the resource consumption of web browser 122 (process 214). If the consumption ratio is lower than the threshold value (NO branch of decision process 212), web browser 122 enables the zone for rendering (process 216). In process 218, web browser 122 renders the zones that are enabled. In some embodiments, web browser 122 performs processes 202-218 prior to loading a webpage, when a user requests a webpage (e.g., process 202). In other embodiments, web browser 122 performs processes 202-218 continuously, even while a user browses or view the webpage on user device 120. In scenarios where the usage metrics of user device 120 are monitored, web browser 122 may adjust the consumption data (process 206), display area (process 208), consumption ratio (process 210), or threshold (decision process 212) while a user views the webpage. Such scenarios allow web browser 122 to dynamically enable and disable zones (processes 214 and 216) based on the workload of user device 120.

Figure 3A:
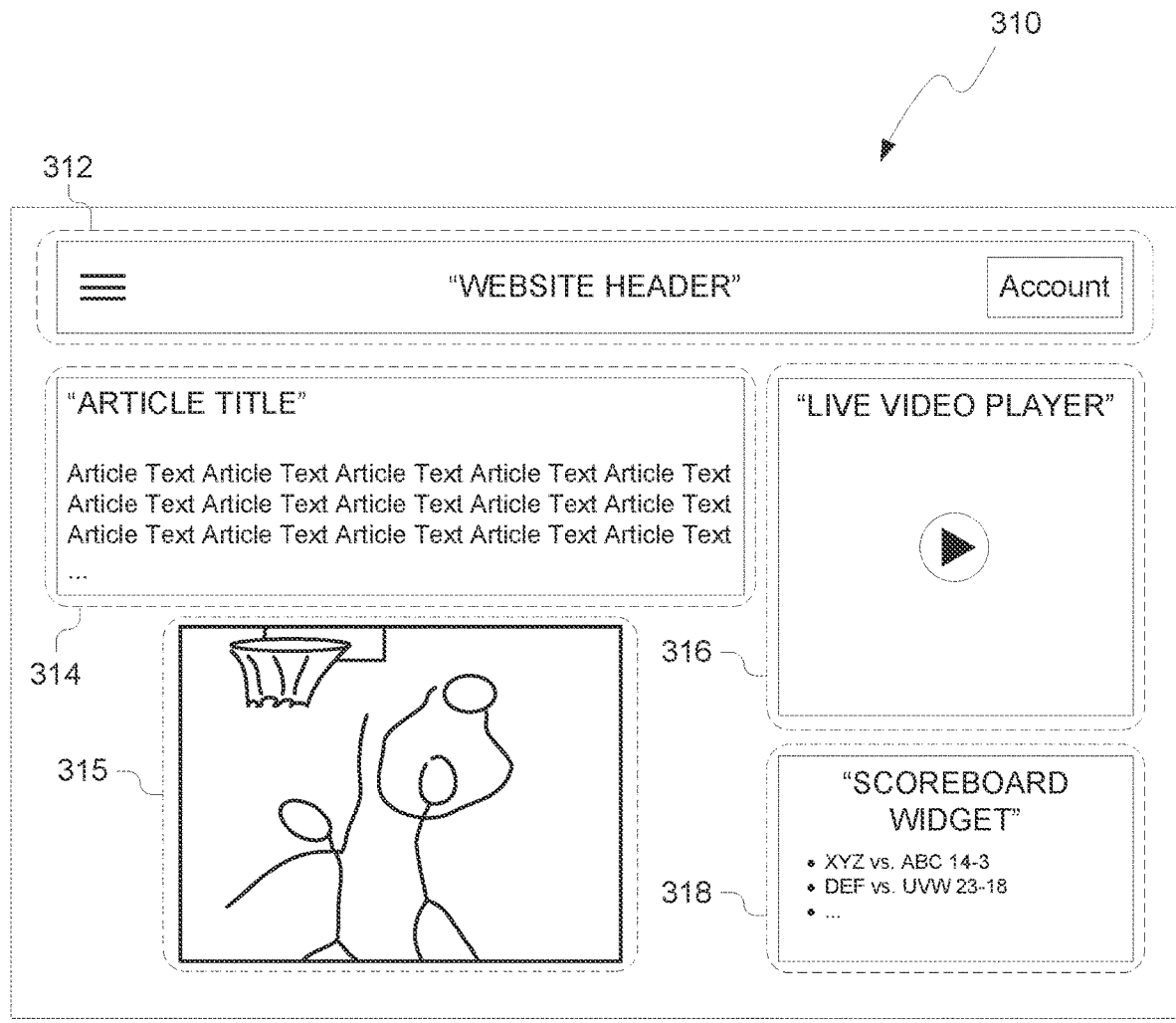
FIGS. 3A and 3B depict an example implementation of a web browser disabling zones of a webpage based on a consumption ratio.
Figure 3B:
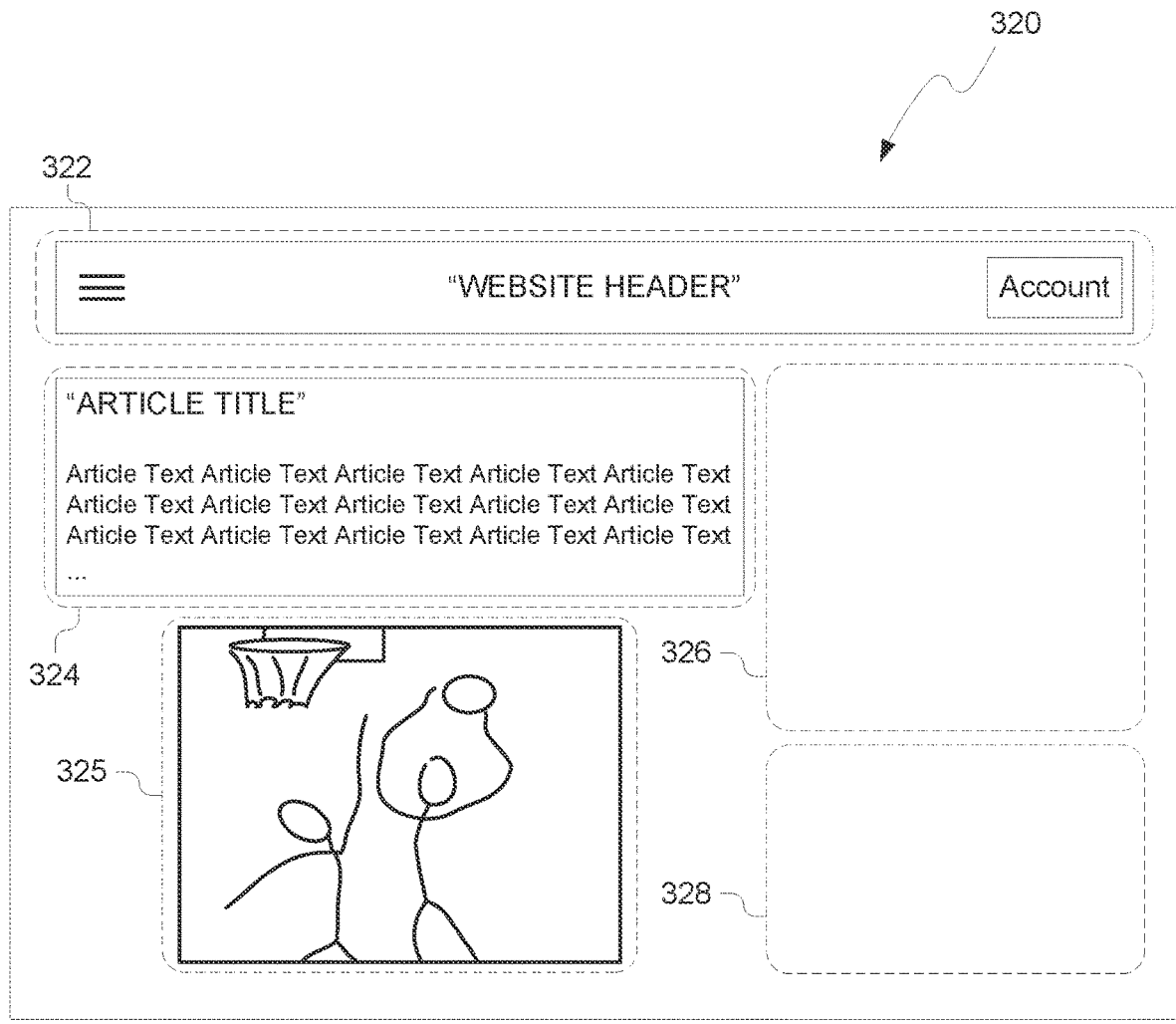

FIGS. 3A and 3B depict an example implementation of web browser 122 disabling zones of a webpage based on a consumption ratio. FIG. 3A depicts native webpage 310 which depicts a webpage if rendered according to retrieved webpage data 114 (i.e., without any zones disabled). FIG. 3A includes native zones 312-318 with header 312, article body 314, image 315, live video player 316 and scoreboard widget 318. As discussed herein, web browser 122 identifies native zones 312-318 based on the HTML, CSS, code, scripts, and the like used to render native zones 312-318. FIG. 3B depicts optimized webpage 320 with optimized zones 322-328, which correspond to native zones 312-318.

For header 312, web browser 122 determines that this zone has a low consumption rate since the zone is mainly comprised of static elements such as text as well as having as relatively small display area. As such, web browser 122 determines header 312 has a lower consumption rate and is therefore optimal for display as optimized header 322 in FIG. 3B. Similarly, web browser 122 determines article body 314 has a low consumption rate since the zone is mainly comprised of static elements such as text and is therefore optimal for display as optimized article body 324 in FIG. 3B.

For image 315, web browser assigns a higher consumption rate for the image due to processing and decompression required for rendering. However, the larger display area of the image relative to other zones, lowers the overall consumption ratio below the threshold value. As such, web browser 122 determines image 315 has a lower consumption rate and is therefore optimal for display as optimized image 325 in FIG. 3B. One of ordinary skill will appreciate that image 315 may be determined to be above the threshold for rendering based on changes to the display area. For example, if image 315 is a high-resolution image, meaning a high consumption rate for the zone, and has a relatively small display area, web browser 122 may determine that image 315 is too resource heavy for the given display area, thereby not including the zone in the optimized webpage 320.

For live video player 316, web browser 122 determines the zone to have an above-threshold consumption rate due to both the high resource usage and relatively small display area that the video player has on webpage 310. As such, web browser 122 removes live video player 316 from rendering in optimized zone 326. If the video player had a larger display area and was more prominent on webpage 310, then web browser 122 may include the video player in optimized zone 326. Similarly, web browser 122 determines scoreboard widget 318 has a relatively higher consumption rate and relatively lower display area. As such, web browser 122 removes scoreboard widget 318 from rendering in optimized zone 328.

Figure 4:
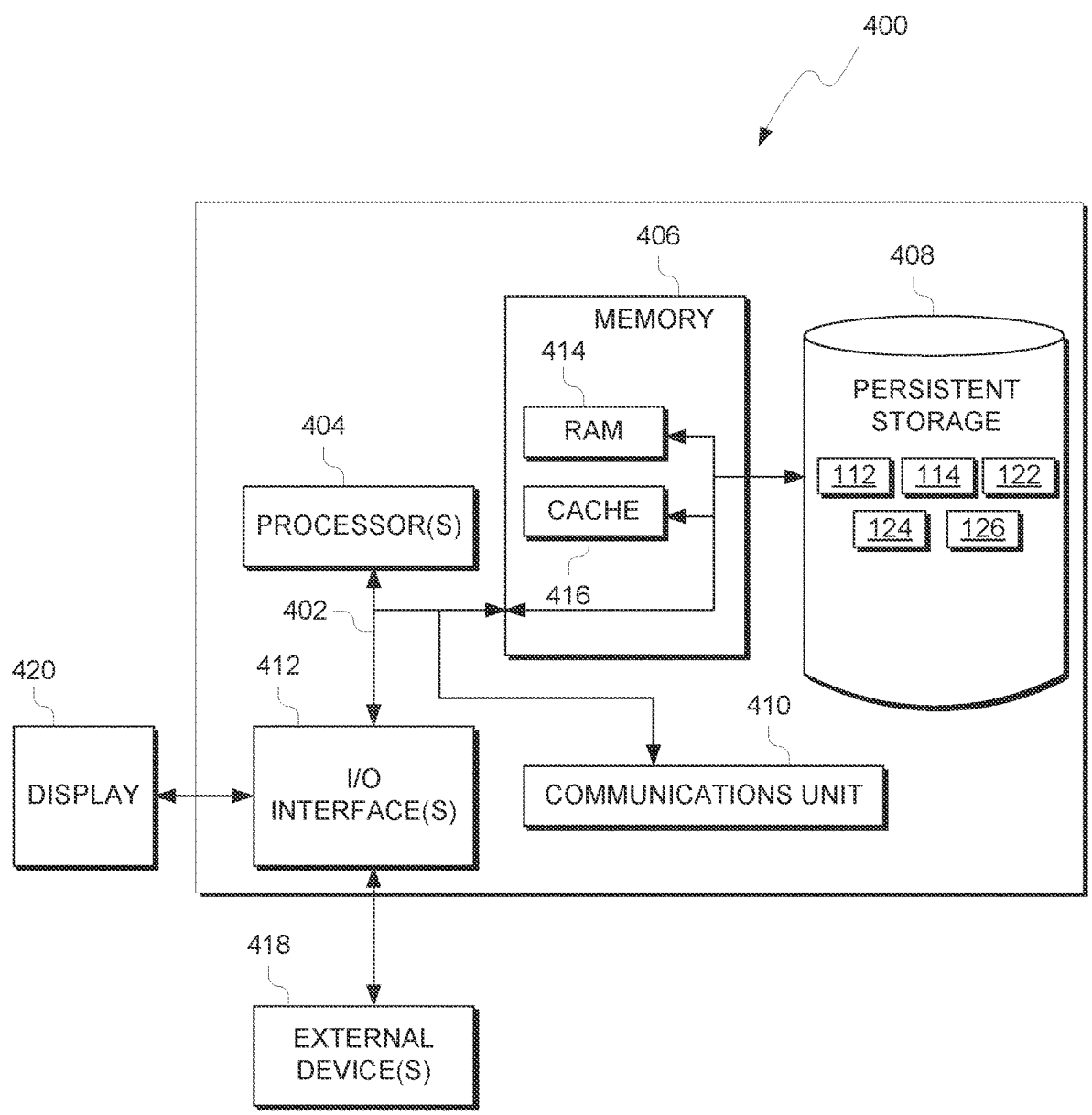
FIG. 4 depicts a block diagram of components of the computing device executing a web browser, in accordance with an exemplary embodiment of the present invention.

FIG. 4 depicts a block diagram, 400, of components of web server 110 and user device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Web server 110 and user device 120 each both include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Webhost program 112, website data 114, web browser 122, zone data 124 and consumption data 126 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 130. In these examples, communications unit 410 includes one or more network interface cards. Communications unit 410 may provide communications through the use of either or both physical and wireless communications links. Webhost program 112, website data 114, web browser 122, zone data 124 and consumption data 126 may be downloaded to persistent storage 408 through communications unit 410.

I/O interface(s) 412 allows for input and output of data with other devices that may be connected to web server 110 or user device 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., webhost program 112, website data 114, web browser 122, zone data 124 and consumption data 126, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
   retrieving a webpage for rendering in a web browser;
   identifying a plurality of zones of the webpage;
   determining a respective resource consumption rate for each zone of the plurality of zones, wherein the respective resource consumption rate is based on one or more types of components comprising each zone of the plurality of zones;
   determining a respective display area for each zone of the plurality of zones;
   determining a respective consumption ratio between the respective resource consumption rate and the respective display area of each zone of the plurality of zones, wherein the respective display area corresponds to a relative size of the one or more types of components comprising each zone of the plurality of zones;
   in response to the respective consumption ratio exceeding a threshold value for at least one zone of the plurality of zones, disabling a rendering of the at least one zone when rendering the webpage in the web browser; and
   in response to the respective consumption ratio below the threshold value for at least one zone of the plurality of zones, enabling a rendering of the at least one zone when rendering the webpage in the web browser.

2. The method of claim 1, wherein the respective consumption ratio directly corresponds to the respective resource consumption rate for the plurality of zones.

3. The method of claim 1, wherein the respective consumption ratio indirectly corresponds to the respective display area for each zone of the plurality of zones.

4. The method of claim 1, wherein the threshold value changes based, at least in part, on operating characteristics of a device executing the web browser.

5. The method of claim 4, wherein the operating characteristics of the device executing the web browser includes one or more the following: CPU usage of the device, RAM usage of the device, bandwidth usage of the device, or power usage of the device.

6. The method of claim 1, wherein the respective resource consumption rate is further based, at least in part, on a portion of hypertext markup language (HTML) of the webpage corresponding to a particular zone of the plurality of zones.

7. The method of claim 1, wherein the respective resource consumption rate is further based, at least in part, on a custom component of the webpage corresponding to a particular zone of the plurality of zones.

8. A computer program product comprising:
   one or more computer-readable storage media and program instructions stored on the one or more computer-readable storage media, the program instructions comprising:
   program instructions to retrieve a webpage for rendering in a web browser;
   program instructions to identify a plurality of zones of the webpage;
   program instructions to determine a respective resource consumption rate for each zone of the plurality of zones, wherein the respective resource consumption rate is based on one or more types of components comprising each zone of the plurality of zones;

program instructions to determine a respective display area for each zone of the plurality of zones;

program instructions to determine a respective consumption ratio between the respective resource consumption rate and the respective display area of each zone of the plurality of zones, wherein the respective display area corresponds to a relative size of the one or more types of components comprising each zone of the plurality of zones;

in response to the respective consumption ratio exceeding a threshold value for at least one zone of the plurality of zones, disabling a rendering of the at least one zone when rendering the webpage in the web browser; and in response to the respective consumption ratio below the threshold value for at least one zone of the plurality of zones, enabling a rendering of the at least one zone when rendering the webpage in the web browser.

9. The computer program product of claim 8, wherein the respective consumption ratio directly corresponds to the respective resource consumption rate for the plurality of zones.

10. The computer program product of claim 8, wherein the respective consumption ratio indirectly corresponds to the respective display area for each zone of the plurality of zones.

11. The computer program product of claim 8, wherein the threshold value changes based, at least in part, on operating characteristics of a device executing the web browser.

12. The computer program product of claim 11, wherein the operating characteristics of the device executing the web browser includes one or more the following: CPU usage of the device, RAM usage of the device, bandwidth usage of the device, or power usage of the device.

13. The computer program product of claim 8, wherein the respective resource consumption rate is further based, at least in part, on a portion of hypertext markup language (HTML) of the webpage corresponding to a particular zone of the plurality of zones.

14. The computer program product of claim 8, wherein the respective resource consumption rate is further based, at least in part, on a custom component of the webpage corresponding to a particular zone of the plurality of zones.

15. A computer system comprising:
one or more computer processors;
one or more computer readable storage media; and
program instructions stored on the computer readable storage media for execution by at least one of the one or more processors, the program instructions comprising:
program instructions to retrieve a webpage for rendering in a web browser;
program instructions to identify a plurality of zones of the webpage;
program instructions to determine a respective resource consumption rate for each zone of the plurality of zones, wherein the respective resource consumption rate is based on one or more types of components comprising each zone of the plurality of zones;
program instructions to determine a respective display area for each zone of the plurality of zones;
program instructions to determine a respective consumption ratio between the respective resource consumption rate and the respective display area of each zone of the plurality of zones, wherein the respective display area corresponds to a relative size of the one or more types of components comprising each zone of the plurality of zones;
in response to the respective consumption ratio exceeding a threshold value for at least one zone of the plurality of zones, disabling a rendering of the at least one zone when rendering the webpage in the web browser; and
in response to the respective consumption ratio below exceeding the threshold value for at least one zone of the plurality of zones, enabling a rendering of the at least one zone when rendering the webpage in the web browser.

16. The computer system of claim 15, wherein the respective consumption ratio directly corresponds to the respective resource consumption rate for the plurality of zones.

17. The computer system of claim 15, wherein the respective consumption ratio indirectly corresponds to the respective display area for each zone of the plurality of zones.

18. The computer system of claim 15, wherein the threshold value changes based, at least in part, on operating characteristics of a device executing the web browser.

19. The computer system of claim 18, wherein the operating characteristics of the device executing the web browser includes one or more the following: CPU usage of the device, RAM usage of the device, bandwidth usage of the device, or power usage of the device.

20. The computer system of claim 15, wherein the respective resource consumption rate is further based, at least in part, on a portion of hypertext markup language (HTML) of the webpage corresponding to a particular zone of the plurality of zones.

* * * * *